United States Patent
Umeda et al.

(10) Patent No.: US 10,676,632 B2
(45) Date of Patent: Jun. 9, 2020

(54) AQUEOUS RESIN DISPERSION, PRODUCTION METHOD FOR AQUEOUS RESIN DISPERSION, HYDROPHILIZATION AGENT, HYDROPHILIZATION METHOD, METAL MATERIAL, AND HEAT EXCHANGER

(71) Applicant: NIPPON PAINT SURF CHEMICALS CO., LTD., Tokyo (JP)

(72) Inventors: Masako Umeda, Tokyo (JP); Koichi Saito, Tokyo (JP); Miwa Uchikawa, Tokyo (JP); Yuko Wada, Tokyo (JP); Akihiro Mizuno, Tokyo (JP); Sohei Kaneko, Tokyo (JP)

(73) Assignee: NIPPON PAINT SURF CHEMICALS CO., LTD., Tokyo (JP)

( * ) Notice: Subject to any disclaimer, the term of this patent is extended or adjusted under 35 U.S.C. 154(b) by 0 days.

(21) Appl. No.: 15/576,197

(22) PCT Filed: Jun. 3, 2016

(86) PCT No.: PCT/JP2016/066669
§ 371 (c)(1),
(2) Date: Nov. 21, 2017

(87) PCT Pub. No.: WO2016/195098
PCT Pub. Date: Dec. 8, 2016

(65) Prior Publication Data
US 2018/0134910 A1  May 17, 2018

(30) Foreign Application Priority Data
Jun. 3, 2015 (JP) ................. 2015-113524

(51) Int. Cl.
| | |
|---|---|
| *C09D 151/00* | (2006.01) |
| *C08F 261/04* | (2006.01) |
| *C08L 51/00* | (2006.01) |
| *C09D 129/04* | (2006.01) |
| *C09D 7/40* | (2018.01) |
| *C08L 29/04* | (2006.01) |
| *C09D 5/08* | (2006.01) |
| *F28F 13/18* | (2006.01) |

(52) U.S. Cl.
CPC .......... *C09D 129/04* (2013.01); *C08F 261/04* (2013.01); *C08L 29/04* (2013.01); *C08L 51/003* (2013.01); *C09D 5/084* (2013.01); *C09D 7/40* (2018.01); *C09D 151/003* (2013.01); *F28F 13/18* (2013.01); *C08L 2201/54* (2013.01); *C08L 2203/20* (2013.01); *F28F 2245/02* (2013.01)

(58) Field of Classification Search
CPC ....... C09D 151/00; C08F 261/04; C08L 51/00
USPC ...................................................... 524/459
See application file for complete search history.

(56) References Cited

U.S. PATENT DOCUMENTS

| | | |
|---|---|---|
| 5,272,200 A | 12/1993 | Yamauchi et al. |
| 7,524,900 B2 | 4/2009 | Nishiura et al. |
| 8,912,264 B2 | 12/2014 | Funabiki et al. |
| 2006/0293448 A1 | 12/2006 | Nishiura et al. |
| 2009/0149593 A1* | 6/2009 | Funabiki ............. C08L 23/0861 524/442 |
| 2015/0251389 A1 | 9/2015 | Maehara et al. |
| 2016/0060765 A1 | 3/2016 | Mizuno et al. |

FOREIGN PATENT DOCUMENTS

| | | | |
|---|---|---|---|
| CN | 101065439 A | 10/2007 | |
| EP | 2862634 A1 | 4/2015 | |
| EP | 2862634 B1 | 4/2017 | |
| JP | H05-086240 A | 4/1993 | |
| JP | H05-093009 A | 4/1993 | |
| JP | H11-193340 A | 7/1999 | |
| JP | 2000-219974 A | 8/2000 | |
| JP | 2000219974 A * | 8/2000 | ........... C09D 163/00 |

(Continued)

OTHER PUBLICATIONS

MT of Ogata—JP 2000-219974 A—MT (Year: 2000).*
Richard J. Lewis, Sr., Hawley's Condensed Chemical Dictionary, 1997, Published by Van Nostrand Reinhold, 13th Edition, pp. 901-902.*
Office Action dated Jul. 15, 2019 in CN Application No. 201680030874.9.
Office Action dated Feb. 13, 2020 in JP Application No. 2016-112167.

*Primary Examiner* — Deve V Hall
(74) *Attorney, Agent, or Firm* — Muncy, Geissler, Olds & Lowe, P.C.

(57) ABSTRACT

Provided are an aqueous resin dispersion of an ethylene-vinyl alcohol copolymer exhibiting excellent dispersion stability, a production method for the aqueous resin dispersion, a hydrophilization agent including the aqueous resin dispersion, a hydrophilization method using the hydrophilization agent, a metal material on which a hydrophilic coating has been formed, and a heat exchanger on which a hydrophilic coating has been formed. Specifically provided are: an aqueous resin dispersion comprising an ethylene-vinyl alcohol copolymer (A) and a radical polymer (B) having a structural unit derived from a radical-polymerizable carboxylic acid monomer (B1-1), wherein the content of the radical polymer (B) is 10-80 mass % relative to the total content of the ethylene-vinyl alcohol copolymer (A) and the radical polymer (B); a production method for the aqueous resin dispersion; a hydrophilization agent including the aqueous resin dispersion; a hydrophilization method using the hydrophilization agent; a metal material on which a hydrophilic coating has been formed; and a heat exchanger on which a hydrophilic coating has been formed.

2 Claims, No Drawings

(56) References Cited

FOREIGN PATENT DOCUMENTS

| | | |
|---|---|---|
| JP | 2001-040231 A | 2/2001 |
| JP | 2002-212487 A | 7/2002 |
| JP | 2006-124616 A | 5/2006 |
| JP | 2008-297523 A | 12/2008 |
| JP | 2010-210127 A | 9/2010 |
| JP | 2013-043944 A | 3/2013 |
| JP | 2013-511587 A | 4/2013 |
| JP | 2013-228187 A | 11/2013 |
| JP | 2015131494 A | 7/2015 |
| WO | WO03/025058 A1 | 3/2003 |
| WO | WO2006/057351 A1 | 6/2006 |
| WO | WO2006/126511 A1 | 11/2006 |
| WO | WO2011/061510 A1 | 5/2011 |
| WO | WO2013/191149 A1 | 12/2013 |
| WO | WO2014/163166 A1 | 10/2014 |

* cited by examiner

AQUEOUS RESIN DISPERSION, PRODUCTION METHOD FOR AQUEOUS RESIN DISPERSION, HYDROPHILIZATION AGENT, HYDROPHILIZATION METHOD, METAL MATERIAL, AND HEAT EXCHANGER

TECHNICAL FIELD

The present invention relates to an aqueous resin dispersion, a method of manufacturing the aqueous resin dispersion, a hydrophilization agent including the aqueous resin dispersion, a hydrophilization method using the hydrophilization agent, a metal material having a hydrophilic coating formed thereon, and a heat exchanger having a hydrophilic coating formed thereon.

BACKGROUND ART

Ethylene-vinyl alcohol copolymer (hereinafter referred to as "EVOH"), which is excellent in transparency, gas-barrier properties, solvent resistance, oil resistance, mechanical strength, and the like, is conventionally used as packaging materials, plastic molded articles, and protective-film forming materials for surfaces of metal, paper, and wood, and the like.

The followings are widely used as a method of forming an EVOH coating: melt extrusion, injection molding, and a method involving lamination of an EVOH film. Further, known is a method involving application of an EVOH solution followed by drying. According to the above method involving application of an EVOH solution, a thin film can easily be obtained, which can be formed even on a surface of a base material having a complicated shape.

However, in the method involving application of an EVOH solution, use of a highly concentrated EVOH solution is difficult due to the solubility issue. Moreover, the method faces challenges in terms of safety and economic efficiency. For example, work environments may deteriorate due to volatilization of an organic solvent, and thus an apparatus for collecting an organic solvent may be required.

Accordingly, technologies have been proposed in which EVOH is prepared in a form of an aqueous dispersion, and the aqueous dispersion of EVOH is then applied (for example, see Patent Documents 1 and 2). These technologies can solve the aforementioned challenges in terms of safety and economical efficiency.

Patent Document 1: Japanese Unexamined Patent Application, Publication No. H05-86240
Patent Document 2: Japanese Unexamined Patent Application, Publication No. H05-93009

DISCLOSURE OF THE INVENTION

Problems to be Solved by the Invention

However, the aqueous dispersions of EVOH obtained according to the technologies described in Patent Documents and 2 suffer from insufficient dispersion stability due to large particle sizes.

The present invention is made in view of the above circumstance. An object of the present invention is to provide an aqueous resin dispersion of EVOH having excellent dispersion stability, a method of manufacturing the aqueous resin dispersion, a hydrophilization agent including the aqueous resin dispersion, a hydrophilization method using the hydrophilization agent, a metal material having a hydrophilic coating formed thereon, and a heat exchanger having a hydrophilic coating formed thereon.

Means for Solving the Problems (1) In order to achieve the above object, the present invention can provide an aqueous resin dispersion including EVOH (A) and a radical polymer (B) having a structural unit derived from a radically polymerizable carboxylic acid monomer (B1-1), the content of the radical polymer (B) being 10 to 80 mass % relative to the total amount of the EVOH (A) and the radical polymer (B).

(2) In (1) according to the present invention, the radical polymer (B) may further have a structural unit derived from a radically polymerizable sulfonic acid monomer (B1-2).

(3) In (1) or (2) according to the present invention, the radical polymer (B) may further have a structural unit derived from at least one radically polymerizable monomer (B2-1) selected form the group consisting of a radically polymerizable monomer represented by the following formula (a), (meth)acrylamide, N-vinylformamide, N-vinylacetamide, and N-vinylpyrrolidone:

[Chem. 1]

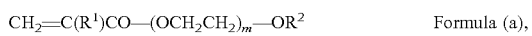

$$CH_2=C(R^1)CO-(OCH_2CH_2)_m-OR^2 \qquad \text{Formula (a)},$$

wherein in the Formula (a), R' represents H or $CH_3$, and $R^2$ represents H or $CH_3$, and m represents an integer of 1 to 200.

(4) In (3) according to the present invention, the radical polymer (B) may further have a structural unit derived from at least one radically polymerizable monomer (B2-2) selected from the group consisting of a radically polymerizable hydroxy group-containing monomer, a radically polymerizable amide group-containing monomer, a radically polymerizable silyl group-containing monomer, a radically polymerizable epoxy group-containing monomer, a radically polymerizable ester group-containing monomer, and a vinyl group-containing monomer.

(5) In (4) according to the present invention, the radical polymer (B) may be a copolymer of a first monomer group and a second monomer group, or a mixture of a copolymer of the first monomer group and a copolymer of the second monomer group, the first monomer group having the radically polymerizable carboxylic acid monomer (B1-1) as an essential ingredient and having the radically polymerizable sulfonic acid monomer (B1-2) as an optional ingredient, and the second monomer group having the radically polymerizable monomer (B2-1) as an essential ingredient and having the radically polymerizable monomer (B2-2) as an optional ingredient.

(6) In any one of (1) to (5) according to the present invention, it is preferred to further include at least one hydrophilic compound (C) selected from the group consisting of a compound having a structure represented by the following formula (b), a compound having a structure of polyvinylpyrrolidone, and a compound having a structure of poly-N-vinylformamide, the total content of the radical polymer (B) and the hydrophilic compound (C) being 10 to 80 mass % relative to the total amount of the EVOH (A), the radical polymer (B), and the hydrophilic compound (C):

[Chem. 2]

$$R^3O(CH_2CH_2O)_n- \qquad \text{Formula (b)},$$

wherein in the formula (b), $R^3$ represents H or $CH_3-$, and n represents an integer of 2 to 100,000.

(7) Moreover, the present invention provides a method of manufacturing the aqueous resin dispersion according to any one of (1) to (5), the method including the step of performing a (co)polymerization reaction in a solution containing the ethylene-vinylalcohol copolymer (A) to obtain the radical polymer (B).

(8) Moreover, the present invention provides the method of manufacturing the aqueous resin dispersion according to (6), the method including the step of performing a (co)polymerization reaction in a solution containing the ethylene-vinylalcohol copolymer (A) and optionally the hydrophilic compound (C) to obtain the radical polymer (B).

(9) Further, the present invention provides a hydrophilization agent including the aqueous resin dispersion (D) according to any one of (1) to (6) of the present invention.

(10) Preferably, the hydrophilization agent according to (9) of the present invention further includes at least one of a hydrophilic compound (E) and a cross-linking agent (F), the content of the hydrophilic compound (E) being 70 mass % or less relative to the total amount of the aqueous resin dispersion (D), the hydrophilic compound (E), and the cross-linking agent (F), and the content of the cross-linking agent (F) being 30 mass % or less relative to the total amount of the aqueous resin dispersion (D), the hydrophilic compound (E), and the cross-linking agent (F).

(11) Preferably the hydrophilization agent according to (9) or (10) of the present invention further includes an anticorrosive material (G) including at least one selected from the group consisting of Zr, V, Ti, Cr, Ce, Nb, and P.

(12) Preferably, the content of the anticorrosive material (G) in (11) of the present invention is 30 mass % or less relative to the total amount of the aqueous resin dispersion (D), the hydrophilic compound (E), and the cross-linking agent (F).

(13) Provided is a hydrophilization method of obtaining a hydrophilic coating with the hydrophilization agent according to any one of (9) to (12) via any of the steps of (I) to (V): (I) immersing a base material into a chemical conversion treatment agent, and washing the base material with water, and then applying the hydrophilization agent to the base material, and drying the hydrophilization agent; (II) applying the hydrophilization agent to a base material, and drying the hydrophilization agent, and further applying and drying another hydrophilization agent different from the hydrophilization agent; (III) allowing a primer to adhere on a base material, and drying the primer, and then applying the hydrophilization agent to the base material, and drying the hydrophilization agent; (IV) applying the hydrophilization agent to a base material, and drying the hydrophilization agent; or (V) immersing a base material into a chemical conversion treatment agent, and further allowing a primer to adhere, and drying the primer, and then applying the hydrophilization agent to the base material, and drying the hydrophilization agent.

(14) Provided is a metal material having a hydrophilic coating formed thereon by allowing the hydrophilization agent according to any one of (9) to (12) of the present invention to adhere on a surface, and drying the hydrophilization agent.

(15) Provided is a heat exchanger having a hydrophilic coating formed thereon by allowing the hydrophilization agent according to any one of (9) to (12) of the present invention to adhere on a surface, and drying the hydrophilization agent.

Effects of the Invention

The present invention can provide an aqueous resin dispersion of EVOH having excellent dispersion stability, a method of manufacturing the aqueous resin dispersion, a hydrophilization agent including the aqueous resin dispersion, a hydrophilization method using the hydrophilization agent, a metal material having a hydrophilic coating formed thereon, and a heat exchanger having a hydrophilic coating formed thereon.

PREFERRED MODE FOR CARRYING OUT THE INVENTION

Below, the embodiments of the present invention will be described. It is noted that the present invention shall not be limited to the following embodiments.

<Aqueous Resin Dispersion>

The aqueous resin dispersion according to the present embodiment includes ethylene-vinylalcohol copolymer (hereinafter referred to as an "EVOH") (A) and a radical polymer (B). Further, the aqueous resin dispersion according to the present embodiment may be characterized by having excellent dispersion stability as compared with that of the conventional aqueous dispersion of EVOH.

Next, the EVOH (A) and the radical polymer (B) will be described in detail. The EVOH (A) has an ethylene structural unit and a vinyl alcohol structural unit. The content of the ethylene structural unit in the EVOH (A) is preferably 24 to 44 mol %. When the content of the ethylene structural unit falls within this range, an aqueous resin dispersion can be obtained which has excellent dispersion stability while maintaining the intrinsic properties of EVOH.

Commercial products can be used for the EVOH (A). They include, for example, "Eval™" from Kuraray Co., Ltd. and "Soarnol™" from Nippon Synthetic Chemical Industry Co., Ltd.

The radical polymer (B) has a structural unit derived from a radically polymerizable carboxylic acid monomer (B1-1). That is, it may be obtained by performing radical polymerization of a radically polymerizable monomer including a radically polymerizable carboxylic acid monomer (B1-1) as an essential ingredient.

Examples of the radically polymerizable carboxylic acid monomer (B1-1) include, for example, unsaturated monocarboxylic acids such as acrylic acid, methacrylic acid, crotonic acid, and cinnamic acid; unsaturated dicarboxylic acids and anhydrides thereof such as maleic acid, itaconic acid, fumaric acid, citraconic acid, and chloromaleic acid; and monoesters of unsaturated dicarboxylic acids such as monomethyl maleate, monoethyl maleate, monobutyl maleate, monomethyl fumarate, monoethyl fumarate, monomethyl itaconate, monoethyl itaconate, and monobutyl itaconate. These may be used alone, or may be used in combination of two or more. Further, metal salts and ammonium salts thereof may be used. Among these, acrylic acid and methacrylic acid are particularly preferred.

The content of the radical polymer (B) is 10 to 80 mass % relative to the total amount of the EVOH (A) and the radical polymer (B). When the content of the radical polymer (B) falls within this range, an aqueous resin dispersion can be obtained which has excellent dispersion stability. The content of the radical polymer (B) is more preferably 20 to 65 mass %.

The radical polymer (B) may further have a structural unit derived from a radically polymerizable sulfonic acid monomer (B1-2) in addition to the radically polymerizable carboxylic acid monomer (B1-1). Examples of the radically polymerizable sulfonic acid monomer (B1-2), for example, methacrylate-based sulfonic acid monomers, acrylamide-based sulfonic acid monomers, allyl-based sulfonic acid monomers, vinyl-based sulfonic acid monomers, and styrene-based sulfonic acid monomers. Among these, AMPS (2-acrylamido-2-methylpropanesulfonic acid) and HAPS (a sodium salt of 3-allyloxy-2-hydroxy-1-propanesulfonic acid) are preferably used. Alternatively, metal salts and ammonium salts of these sulfonic acid monomers may be used. It is noted that these monomers may be used alone, or may be used in combination of two or more.

The radical polymer (B) may further have a structural unit derived from at least one radically polymerizable monomer (B2-1) selected from the group consisting of a radically polymerizable monomer represented by the following formula (a), (meth)acrylamide, N-vinylformamide, N-vinylacetamide, and N-vinylpyrrolidone;

[Chem. 3]

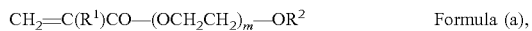

$$CH_2=C(R^1)CO-(OCH_2CH_2)_m-OR^2 \quad \text{Formula (a)},$$

wherein in the formula (a), $R^1$ represents H or $CH_3$, and $R^2$ represents H or $CH_3$, and m represents an integer of 1 to 200.

That is, hydrophilicity and dispersion stability are conferred because the radically polymerizable monomer (B2-1) is (poly)ethylene glycol mono(meth)acrylate or methoxypolyethylene glycol (meth)acrylate represented by the above formula (a) wherein m represents an integer of 1 to 200, or has an amide bond.

In addition to the radically polymerizable monomer (B2-1) represented by the above formula (a), the radical polymer (B) may further have a structural unit derived from at least one radically polymerizable monomer (B2-2) selected from the group consisting of radically polymerizable hydroxy group-containing monomers such as hydroxypropyl (meth)acrylate; radically polymerizable amide group-containing monomers such as N-methylol (meth)acrylamide and N,N-dimethyl (meth)acrylamide; radically polymerizable silyl-containing monomers such as γ-(meth)acryloxypropyltrimethoxysilane; radically polymerizable epoxy group-containing monomers such as glycidyl methacrylate; radically polymerizable ester group-containing monomer such as methyl (meth)acrylate and ethylene glycol dimethacrylate; and vinyl group-containing monomers such as vinyl acetate, styrene, acrylonitrile, and divinylbenzene. Hydrophilicity, dispersion stability, or cross-linkablity is conferred by having a structural unit derived from the radically polymerizable monomer (B2-2).

The radical polymer (B) may be a copolymer of a first monomer group and a second monomer group, or a mixture of a copolymer of the first monomer group and a copolymer of the second monomer group, the first monomer group having the radically polymerizable carboxylic acid monomer (B1-1) as an essential ingredient and having the radically polymerizable sulfonic acid monomer (B1-2) as an optional ingredient, and the second monomer group having the radically polymerizable monomer (B2-1) as an essential ingredient and having the radically polymerizable monomer (B2-2) as an optional ingredient. This can provide an aqueous resin dispersion having excellent dispersion stability as well as having hydrophilicity. Types of the copolymers may be any of random copolymers, graft copolymers, or block copolymers.

Further, the aqueous resin dispersion according to the present embodiment may further includes at least one hydrophilic compound (C) selected from the group consisting of a compound having a structure represented by the following formula (b) and a compound having a structure of polyvinylpyrrolidone (PVP):

[Chem. 4]

$$R^3O(CH_2CH_2O)_n- \quad \text{Formula (b)},$$

wherein in the formula (b), $R^3$ represents H or $CH_3$—, and n represents an integer of 2 to 100,000.

Further inclusion of the hydrophilic compound (C) further confers hydrophilicity and excellent dispersion stability. Examples of the compound having a structure represented by the formula (b) include, for example, polyethylene glycol (PEG), polyethylene oxide (PEO), polyoxyethylene group-containing polyvinyl alcohol (EO-PVA), and the like. Examples of the compound having a structure of polyvinylpyrrolidone (PVP) include PVP and PVP-modified PVA, and the like.

In the present embodiment, the total content of the radical polymer (B) and the hydrophilic compound (C) is 10 to 80 mass % relative to the total amount of the EVOH (A), the radical polymer (B), and the hydrophilic compound. When the total content of the radical polymer (B) and the hydrophilic compound (C) falls within this range, an aqueous resin dispersion can be obtained which has excellent dispersion stability. The total content of the radical polymer (B) and the hydrophilic compound (C) is more preferably 30 to 70 mass %.

It is noted that the aqueous resin dispersion according to the present embodiment may include various additives such as a solvent as long as the excellent dispersion stability is not impaired.

<Method of Manufacturing Aqueous Resin Dispersion>

A method of manufacturing the aforementioned aqueous resin dispersion may include the step of performing a (co)polymerization reaction in a solution containing the EVOH (A) to obtain the radical polymer (B). When the hydrophilic compound (C) is to be included in the aqueous resin dispersion, the method preferably includes the step of performing a (co)polymerization reaction in a solution containing the EVOH (A) and optionally the hydrophilic compound (C) to obtain the radical polymer (B). For the radical polymerization method, a conventionally known method may be used, and a conventionally known radical polymerization initiator may be used.

Further, when a (co)polymer of the first monomer group is used as the radical polymer (B), copolymerization is preferably performed by adding the first monomer group to a solution containing the EVOH (A) and optionally the hydrophilic compound (C). Similarly, when a copolymer of the first monomer group and the second monomer group is used as the radical polymer (B), the first monomer group and the second monomer group may be added simultaneously to a solution containing the EVOH (A) and optionally the hydrophilic compound (C) to allow copolymerization to occur, or the first monomer group may be first added to allow (co)polymerization to occur, and then the second monomer group may be added to allow (co)polymerization to occur.

It is noted that in the method of manufacture according to the present embodiment, instead of performing a (co)polymerization reaction in a solution containing the EVOH (A), the radical polymer (B) may be obtained by mixing a (co)polymer of the first monomer group and a (co)polymer of the second monomer group in the above solution. For example, (B1) obtained by (co)polymerization of the first monomer group in the presence of the EVOH (A) may be added to and stir-mixed with a (co)polymer (B2) separately obtained by polymerization of the second monomer group to obtain an aqueous resin dispersion.

An example of the method of manufacturing the aqueous resin dispersion according to the present embodiment will be described below. First, an appropriate amount of a solution mixture of water and methanol is added to the EVOH (A) in a form of pellets. After addition, this is heated at or above the glass transition point of the EVOH but below the boiling point of the solvent, and stirred for a predetermined period of time to obtain a solution of the EVOH (A).

Subsequently, the hydrophilic compound (C) is optionally dissolved in the EVOH (A) solution. To this, a liquid mixture of a monomer liquid containing the radically polymerizable carboxylic acid monomer (B1-1) as an essential ingredient and the radically polymerizable sulfonic acid monomer (B1-2) as an optional ingredient or optionally a monomer liquid containing the radically polymerizable monomer (B2-1) as an essential ingredient and the radically polymerizable monomer (B2-2) as an optional ingredient; and a solution containing a radical polymerization initiator are added dropwise under a nitrogen atmosphere.

Subsequently, a base (preferably aqueous ammonia) in an amount corresponding to the acid equivalent of the blended monomers (B1-1) and (B1-2) is added dropwise to achieve neutralization. Then, methanol is distilled out under heating while supplying water to replace the medium with water.

Subsequently, this is cooled and filtered to obtain an aqueous resin dispersion of the EVOH (A) having excellent dispersion stability according to the present embodiment.

The aqueous resin dispersion according to the present embodiment as described above can be used for various applications. In particular, the aqueous resin dispersion according to the present embodiment is preferably used for a hydrophilization agent as described below.

<Hydrophilization Agent>

The hydrophilization agent according to the present embodiment includes the aforementioned aqueous resin dispersion (hereinafter referred to as the "aqueous resin dispersion (D)"). In particular, the aqueous resin dispersion (D) is preferably used which includes the radical polymer (B) having a structural unit derived from the aforementioned radically polymerizable monomers (B2-1) and (B2-2) in view of obtaining higher hydrophilicity. The hydrophilization agent according to the present embodiment may preferably be used for metal, in particular aluminum and alloys thereof to form a hydrophilic coating having excellent hydrophilicity, in particular, excellent sustained hydrophilicity after adhesion of contaminants and also having excellent adhesiveness, drainage, and anti-contamination effects.

Preferably, the hydrophilization agent according to the present embodiment further includes one of the hydrophilic compound (E) and the cross-linking agent (F) in addition to the aqueous resin dispersion (D). As the hydrophilic compound (E), used are cross-linkable microparticles and modified polyvinyl alcohol as well as a resin having a hydrophilic group such as a carboxylic acid group and a sulfonic acid group, or a hydroxy group. Examples of the cross-linking agent (F) include, for example, melamine resins, phenol resins, oxazoline compounds, silane coupling agents, and the like. These may be used alone, or may be used in combination of two or more.

Preferably, the content of the hydrophilic compound (E) and the cross-linking agent (F) is 70 mass % or less relative to the total amount of the aqueous resin dispersion (D), the hydrophilic compound (E), and the cross-linking agent (F), and the content of the cross-linking agent (F) is 30 mass % or less relative to the total amount of the aqueous resin dispersion (D), the hydrophilic compound (E), and the cross-linking agent (F). When the content of the hydrophilic compound (5) and the cross-linking agent (F) falls within this range, a hydrophilic coating having excellent hydrophilicity, in particular, excellent sustained hydrophilicity after adhesion of contaminants, and also having excellent adhesiveness, drainage, and anti-contamination effects can be formed. The content of the hydrophilic compound (E) is more preferably less than 50 mass %.

Specific examples of the hydrophilic compound (E) include cross-linkable microparticles, polyvinyl alcohol (PVA), modified polyvinyl alcohol, polyacrylic acid (PAA), polyacrylamide (PAAm), carboxymethylcellulose (CMC), polyvinylpyrrolidone (PVP), polyalkylene ether (PAE), N-methylolacrylamide (NMAM), poly-N-vinylformamide (PNVF), acrylic acid copolymers, sulfonic acid copolymers, amide copolymers, and the like. These may be used alone, or may be used in combination of two or more.

As the cross-linkable microparticles, those having an average particle size of about 200 to 400 nm can be used which can be obtained by dispersion polymerization of N-methylolacrylamide as the main monomer in an alcohol-based solvent using methoxypolyethylene glycol methacrylate and the like as a dispersion stabilizing agent.

As the cross-linking agent (F), commercial products can be used, including, for example, "Cymel (registered trademark)" from Nihon Cytec Industries Inc. as a melamine resin, "Resitop" from Gun Ei Chemical Industry Co., Ltd. as a phenol resin, "Epocros (registered trademark)" from Nippon Shokubai Co., Ltd. as an oxazoline compound, and a product from Shin-Etsu Chemical Co., Ltd. as a silane coupling agent.

Preferably, the hydrophilization agent according to the present embodiment further includes an anticorrosive material (G). Examples of the anticorrosive material (G) include, for example, zirconium compounds, vanadium compounds, titanium compounds, niobium compounds, phosphorus compounds, cerium compounds, chromium compounds, and the like. These may be used alone, or may be used in combination of two or more.

Zirconium compounds include fluorozirconic acid, lithium fluorozirconate, sodium fluorozirconate, potassium fluorozirconate, an ammonium salt of fluorozirconic acid, zirconium sulfate, zirconyl sulfate, zirconium nitrate, zirconyl nitrate, zirconium fluoride, zirconium carbonate, and zirconium hydrofluorate.

Vanadium compounds include vanadyl sulfate, vanadyl nitrate, vanadyl phosphate, metavanadic acid, ammonium metavanadate, sodium metavanadate, potassium metavanadate, vanadium pentoxide, vanadium oxytrichloride, vanadium oxide, vanadium dioxide, vanadium oxyacetylacetonate, and vanadium chloride.

As a titanium compound, a carbonate, oxide, hydroxide, nitrate, sulfate, phosphate, fluoride, fluoroacid (salt), organic acid salt, organic complex compound, and the like of Ti can be used. Specific examples include titanium(IV) oxide (titania), titanium nitrate, titanium(III) sulfate, titanium(IV) sulfate, titanyl sulfate $TiOSO_4$, titanium(III) fluoride, titanium (IV) fluoride, hexafluorotitanic acid $H_2TiF_6$, ammonium hexafluorotitanate $(NH_4)_2TiF_6$, titanium laurate, titanium tetraacetylacetonate $Ti(C_5H_7O_2)_4$, titanium lactate ammonium salt, titanium lactate, polyhydroxytitanium stearate, and the like.

Titanium alkoxide can also be used as a titanium compound. Titanium alkoxide has a structure in which alkoxy groups are coordinated to the central titanium atom. Such a compound may undergo hydrolysis in water to form somewhat condensed oligomers or polymers. A titanium alkoxide used in the present application is preferably such that alkoxy groups are compatible with a chelating agent. Examples include titanium tetraisopropoxide, titanium tetra normal butoxide, titanium butoxide dimer, titanium tetra-2-ethylhexoxide, titanium diisopropoxy bis(acetylacetonate), titanium tetraacetylacetonate, titanium dioctyloxy bis(octyleneglycolate), titanium diisopropoxy bis(ethylacetoacetate), titanium diisopropoxy bis(triethanolaminate), titanium lactate ammonium salt, titanium lactate, polyhydroxytitanium stearate, and the like. Particularly preferred examples include titanium diisopropoxy bis(ethylacetoacetate), titanium diisopropoxy bis(triethanolaminate), and the like.

Ce compounds include cerium acetate, cerium(III) or (IV) nitrate, cerium chloride, and the like.

Nb compounds include niobium compounds and the like such as niobium fluoride, niobium oxide, niobium hydroxide, and niobium phosphate.

Cr compounds include chromium sulfate, chromium nitrate, chromium fluoride, chromium phosphate, chromium oxalate, chromium acetate, chromium bisphosphate, chromium acetylacetonate ($Cr(C_5H_7O_2)_3$), and the like, and an aqueous mixture containing chromic acid, orthophosphoric acid, and a fluoride.

Phosphorus compounds include phosphoric acid, polyphosphoric acid, tripolyphosphoric acid, metaphosphoric acid, ultra phosphoric acid, phytic acid, phosphinic acid, hydroxyethylidenediphosphonic acid, nitrilotris(methylenephosphonic acid), phosphonobutanetricarboxylic acid, (PBTC), ethylenediaminetetra(methylenephosphonic acid), tetrakis(hydroxymethyl)phosphonium salt, acrylic acid-vinyl phosphonic acid copolymer, and the like.

The anticorrosive material (G) can be included in an amount from 0 mass % to 30 mass % relative to the total amount of the aqueous resin dispersion (D), the hydrophilic compound (E), and the cross-linking agent (F). The content of the anticorrosive material (G) is preferably 20 mass % or less. When the content of the anticorrosive material (G) falls within this range, the corrosion resistance of the hydrophilic coating described below formed with a hydrophilization agent can be improved, eliminating the necessity of forming a chemical conversion coating before forming the hydrophilic coating.

It is noted that the hydrophilization agent according to the present embodiment preferably includes a hydrophilic compound including a polyoxyethylene group such as polyethylene oxide and oxyalkylene group-containing polyvinyl alcohol, which constitutes the hydrophilic compound (C) to be blended in the aforementioned aqueous resin dispersion (D). This can provide superior hydrophilicity.

An additional component may be added to the achieve an additional function in an amount within a range where that function is not impaired. For example, a hydrophilic additive such as a surfactant, colloidal silica, titanium oxide, and saccharides; an additive such as tannic acid, imidazoles, triazines, triazoles, guanidines, and hydrogens; a pigment, an antimicrobial agent, a dispersing agent, a lubricant, a deodorizing agent, a solvent, and the like may be included.

The hydrophilization agent according to the present embodiment may be obtained by adding and thoroughly stirring the aqueous resin dispersion (D) and optionally the hydrophilic compound (E), the cross linking agent (F), and the anticorrosive material (G) each in a predetermined amount.

<Hydrophilic Coating>

The hydrophilic coating according to the present embodiment may be obtained by applying the aforementioned hydrophilization agent onto a metal base material such as aluminum and alloys thereof followed by drying. Methods of application include the roll coating method, the bar coating method, the dipping method, the spray method, the brush coating method, and the like. The hydrophilic coating can be obtained by drying and baking, for example, at a temperature of 120 to 300° C. for 3 seconds to 60 minutes after application. When the baking temperature is less than 120° C., sufficient film-formability can not be obtained, resulting in possible dissolution of a coating after immersed into water. When it is more than 300° C., a resin may decompose, resulting in impaired hydrophilicity of the hydrophilic coating.

The hydrophilic coating formed by the method described above is a coating formed on a surface of a metal base material such as aluminum and alloys thereof, the coating having excellent hydrophilicity, in particular excellent sustained hydrophilicity after adhesion of contaminants, and also having excellent adhesiveness, drainage, and anti-contamination effects. That is, a hydrophilic coating having excellent drainage and anti-contamination effects while maintaining hydrophilicity can be formed by virtue of the properties of EVOH having both a hydrophilic group and a hydrophobic group.

The thickness of the hydrophilic coating is preferably 0.05 $g/m^2$ or more, more preferably 0.1 to 2 $g/m^2$. When the thickness of the coating is less than 0.05 $g/m^2$, the coating may have insufficient sustained hydrophilicity, processability, adhesiveness, and corrosion resistance.

<Chemical Conversion Coating>

It is noted that a chemical conversion coating can be formed on a metal base material such as aluminum and alloys thereof prior to formation of the hydrophilic coating according to the present embodiment. The chemical conversion coating treatment agent for use in the present embodiment may be any as long as a chemical conversion coating can be formed appropriately depending on the material of a substrate. For example, Alsurf™ 900, Alsurf™ 970, and Alsurf™ 407/47 from Nippon Paint Surf Chemicals Co., Ltd. may be used. There is no particular limitation for a method of applying these chemical conversion coating treatment agents, but either the dipping method or the spray method may be used. With regard to the temperature of a chemical conversion treatment agent, a chemical conversion coating can be obtained at a temperature of 45° C. to 70° C. for 20 seconds to 900 seconds.

<Primer>

A primer can be formed on a metal base material such as aluminum and alloys thereof prior to formation of the hydrophilic coating according to the present embodiment. The chemical conversion coating treatment agent for use in the present embodiment may be any as long as a chemical conversion coating can be formed appropriately depending on the material of a substrate. For example, Surfalcoat™ 510 and Surfalcoat™ 520 from Nippon Paint Surf Chemicals Co., Ltd. may be used. Methods of applying these chemical conversion coating treatment agents include the roll coating method, the bar coating method, the dipping method, the spray method, the brush coating method, and the like. A primer can be obtained at a temperature of 40° C. to 300° C. for 20 seconds to 900 seconds after application.

<Step of Conditioning Surface of Base Material>

Surface conditioning other than the aforementioned coating-formation treatment can be performed on a metal base material such as aluminum for use in the present embodiment. In the surface conditioning step, contaminants, an ununiform aluminum oxide film, flux, and the like present on a surface of a base material of aluminum or an aluminum alloy are removed to obtain a clean surface suitable for forming a chemical conversion coating in the subsequent step.

At least one or more selected from water, nitric acid, sulfuric acid, hydrofluoric acid, sodium hydroxide, and potassium hydroxide may be used as a surface conditioning liquid. Methods of applying a surface conditioning liquid include the spray method, the dipping method, and the like. The temperature of a surface conditioning liquid is preferably 10° C. to 70° C. When the temperature of a surface conditioning liquid is lower than 10° C., sufficient surface cleaning may not be effected, and a surface suitable for forming a desired chemical conversion coating may not be obtained. Further, when the temperature of a surface conditioning liquid is higher than 70° C., a surface conditioning apparatus may be corroded, or an airborne mist of the surface conditioning liquid may be released, resulting in a deteriorated work environment. A surface conditioning time of 5 seconds to 600 seconds is preferred. When the surface conditioning time is shorter than 5 seconds, sufficient surface cleaning may not be effected, and a surface suitable for forming a desired chemical conversion coating may not be obtained. Further, when the surface conditioning time is longer than 600 seconds, an alloy component contained in a base material of an aluminum alloy significantly segregates at a surface, and a surface suitable for forming a desired chemical conversion coating may not be obtained.

It is noted that the present invention shall not be limited to the aforementioned embodiments. Modifications and improvements are encompassed within the present invention as long as the object of the present invention can be achieved.

EXAMPLES

Below, the present invention will be described in more detail with reference to Examples. However, the present invention shall not be limited to these Examples.

Examples of Manufacturing Aqueous Resin Dispersion

Example 1

To a flask to which a stirrer, a condenser, a temperature controller, and dripping funnels (2 lines) were attached, 60 parts by mass of a pellet-like EVOH (A) and a mixture of water and methanol 9 times in parts by mass relative to the EVOH (A) (water:methanol=1:1 by mass ratio) were charged, and heated to 75° C., and vigorously stirred for 1 hour or more to obtain an EVOH (A) solution.

Subsequently, a methanol solution of 40 parts by mass of acrylic acid and an aqueous solution of 0.6 parts by mass of ammonium persulfate were each placed in a separate dripping funnel, and added dropwise to the EVOH (A) solution under a nitrogen atmosphere. At this time, dropwise addition was performed over 30 minutes while maintaining the solution temperature at 75° C., and stirring was continued at the same temperature for 2 hours after completion of dropwise addition.

Subsequently, acrylic acid-equivalent aqueous ammonia (prepared by dilution with the same amount of methanol as that of water in the aqueous ammonia) was added dropwise over about 20 minutes to achieve neutralization. Then, a condenser tube for solvent removal was attached, and heated while supplying water to distill methanol away, thereby replacing the medium with water. Subsequently, this was cooled and filtered to obtain a stable aqueous resin dispersion.

Example 2 to Example 37

In Examples 2 to 37, using a similar procedure as in Example 1, the EVOH (A) and optionally the hydrophilic compound (C) were mixed and dissolved according to compositions shown in Table 1, and the radically polymerizable monomers (B1-1) and (B1-2) and optionally the radically polymerizable monomers (B2-1) and (B2-2) were mixed. This and an aqueous solution of ammonium persulfate were simultaneously but separately added dropwise to effect polymerization. The acid was neutralized with equivalent aqueous ammonia, and methanol was then replaced with water, and then cooled and filtered to obtain an aqueous resin dispersion. It is noted that in each of Comparative Examples 1 to 6, manufacture of a dispersion was tried by a similar procedure. However, only in Comparative Example 2, manufacture was performed without blending the radically polymerizable carboxylic acid monomer (B1-1).

<Dispersion Stability>

Dispersion stability was evaluated for the aqueous resin dispersions from Examples 1 to 37 and the dispersions from Comparative Examples 1 to 6 manufactured according to the aforementioned procedure. Results are shown in Table 1.

(Evaluation Criteria)

3: no sedimentation separation was observed after one month has passed.

2: precipitates were developed after one month had passed.

1: significant aggregation and sedimentation separation were developed.

TABLE 1

| Ingredients | | | | Example 1 | 2 | 3 | 4 | 5 | 6 | 7 | 8 | 9 | 10 | 11 | 12 |
|---|---|---|---|---|---|---|---|---|---|---|---|---|---|---|---|
| (A) | EVOH | | Ethylene ratio 25 mol % | 60 | 80 | — | — | — | — | 42 | — | 36 | 53 | 37 | 37 |
| | | | Ethylene ratio 32 mol % | — | — | 90 | — | 38 | 36 | — | 63 | — | — | — | — |
| | | | Ethylene ratio 44 mol % | — | — | — | 75 | — | — | — | — | — | — | — | — |
| (B) | (B1-1) | Radically polymerizable | Acrylic acid | 40 | 18 | 10 | 25 | 31 | 31 | 21 | 19 | 14 | 25 | 21 | 21 |
| | | | Methacrylic acid | — | — | — | — | — | — | — | — | — | — | — | — |
| | (B1-2) | Radically polymerizable sulfonic | HAPS | — | 2 | — | — | — | — | — | — | — | — | — | — |
| | | | AMPS | — | — | — | — | — | — | — | — | — | — | — | — |
| | (B2-1) | Radically polymerizable monomer of Formula (a) | m = 1 R1, R2: H | — | — | — | — | — | — | — | — | — | — | — | — |
| | | | m = 23 R1, R2: Me | — | — | — | — | 31 | — | — | — | — | — | — | — |
| | | | m = 45 R1, R2: Me | — | — | — | — | — | 31 | 27 | — | 35 | 11 | — | — |
| | | | m = 113 R1, R2: Me | — | — | — | — | — | — | — | — | — | — | 21 | 21 |
| | | Radically polymerizable | NVF | — | — | — | — | — | — | — | — | — | — | — | — |
| | | | AAm | — | — | — | — | — | — | — | — | — | — | — | — |

TABLE 1-continued

| | | | | | | | | | | | | | | | |
|---|---|---|---|---|---|---|---|---|---|---|---|---|---|---|---|
| (B2-2) | Radically polymerizable | DMAA | — | — | — | — | — | — | 10 | — | — | — | — | — |
| (C) | Hydrophilic compound | GMA | — | — | — | — | — | — | — | — | — | — | — | — |
| | | PEG | — | — | — | — | — | — | — | — | 14 | 11 | 21 | 16 |
| | | PEO | — | — | — | — | — | — | — | — | — | — | — | 5 |
| | | PVP | — | — | — | — | — | — | — | 18 | — | — | — | — |
| | | EO-PVA | — | — | — | — | — | — | — | — | — | — | — | — |
| | | PNVF | — | — | — | — | — | — | — | — | — | — | — | — |
| | Dispersion stability | | 3 | 3 | 3 | 3 | 3 | 3 | 3 | 3 | 3 | 3 | 3 | 3 |

| | | | Example | | | | | | | | | | |
|---|---|---|---|---|---|---|---|---|---|---|---|---|---|
| | Ingredients | | 13 | 14 | 15 | 16 | 17 | 18 | 19 | 20 | 21 | 22 | | |
| (A) | EVOH | Ethylene ratio 25 mol % | 32 | 36 | 36 | 38 | 28 | — | — | 40 | 40 | 40 | | |
| | | Ethylene ratio 32 mol % | — | — | — | — | — | 35 | — | — | — | — | | |
| | | Ethylene ratio 44 mol % | — | — | — | — | — | — | 35 | — | — | — | | |
| (B) (B1-1) | Radically polymerizable | Acrylic acid | 32 | 29 | 29 | 23 | — | 21 | — | 32 | — | 23 | | |
| | | Methacrylic acid | — | — | — | — | 28 | — | 14 | — | 32 | — | | |
| (B1-2) | Radically polymerizable sulfonic | HAPS | — | — | — | — | — | 2 | — | — | — | — | | |
| | | AMPS | — | — | — | — | — | — | — | — | — | — | | |
| (B2-1) | Radically polymerizable monomer of Formula (a) | m = 1 R1, R2: H | — | — | — | — | — | — | — | — | — | — | | |
| | | m = 23 R1, R2: Me | — | — | — | — | — | — | — | — | — | — | | |
| | | m = 45 R1, R2: Me | — | — | — | — | 26 | 21 | — | — | — | — | | |
| | | m = 113 R1, R2: Me | 18 | 14 | 20 | — | — | — | 8 | 16 | 16 | 16 | | |
| | Radically polymerizable | NVF | — | — | — | 15 | — | — | — | — | — | — | | |
| | | AAm | — | — | — | — | 2 | — | — | — | — | — | | |
| (B2-2) | Radically polymerizable | DMAA | — | — | — | — | — | — | — | — | — | — | | |
| | | GMA | — | — | — | — | — | — | 1 | — | — | — | | |
| (C) | Hydrophilic compound | PEG | — | — | — | 24 | 8 | 21 | 21 | 12 | 12 | 21 | | |
| | | PEO | — | — | — | — | — | — | — | — | — | — | | |
| | | PVP | 18 | — | — | — | — | — | — | — | — | — | | |
| | | EO-PVA | — | 21 | — | — | — | — | — | — | — | — | | |
| | | PNVF | — | — | 15 | — | 8 | — | — | — | — | — | | |
| | Dispersion stability | | 3 | 3 | 3 | 3 | 3 | 3 | 3 | 3 | 3 | 3 | | |

| | | | Example | | | | | | | | | | | | | | |
|---|---|---|---|---|---|---|---|---|---|---|---|---|---|---|---|---|---|
| | Ingredients | | 23 | 24 | 25 | 26 | 27 | 28 | 29 | 30 | 31 | 32 | 33 | 34 | 35 | 36 | 37 |
| (A) | EVOH | Ethylene ratio 25 mol % | 35 | 35 | 33 | 25 | 25 | — | — | — | — | — | — | — | — | — | — |
| | | Ethylene ratio 32 mol % | — | — | — | — | — | 40 | — | 40 | 60 | 40 | 40 | 40 | 49 | 50 | 50 |
| | | Ethylene ratio 44 mol % | — | — | — | — | — | — | 40 | — | — | — | — | — | — | — | — |
| (B) (B1-1) | Radically polymerizable | Acrylic acid | 21 | 21 | 33 | 45 | 45 | 32 | 32 | 32 | 30 | 30 | 30 | 32 | 24 | 40 | 40 |
| | | Methacrylic acid | — | — | — | — | — | — | — | — | — | — | — | — | — | — | — |
| (B1-2) | Radically polymerizable sulfonic | HAPS | — | — | — | — | — | — | — | — | — | — | — | — | — | — | — |
| | | AMPS | — | — | — | — | — | — | — | — | — | 2 | — | — | — | — | — |
| (B2-1) | Radically polymerizable monomer of Formula (a) | m = 1 R1, R2: H | — | — | — | — | — | — | — | — | — | — | — | — | — | — | 10 |
| | | m = 23 R1, R2: Me | — | — | 13 | 10 | — | — | — | — | — | — | — | — | — | — | — |
| | | m = 45 R1, R2: Me | — | — | — | — | 10 | — | — | — | — | — | — | — | — | — | — |
| | | m = 113 R1, R2: Me | 15 | 15 | — | — | — | 16 | 16 | 16 | 10 | 16 | 16 | 16 | 11 | — | — |
| | Radically polymerizable | NVF | 7 | — | — | — | — | — | — | — | — | — | — | — | — | — | — |
| | | AAm | — | 7 | — | — | — | — | — | — | — | — | — | — | — | — | — |
| (B2-2) | Radically polymerizable | DMAA | — | — | — | — | — | — | — | — | — | — | — | — | — | — | — |
| | | GMA | — | — | — | — | — | — | — | — | — | — | — | — | — | 10 | — |
| (C) | Hydrophilic compound | PEG | 22 | 22 | 20 | 20 | 20 | 12 | 12 | 12 | — | — | — | 12 | 17 | — | — |
| | | PEO | — | — | — | — | — | — | — | — | — | — | 12 | — | — | — | — |
| | | PVP | — | — | — | — | — | — | — | — | — | — | — | 14 | — | — | — |
| | | EO-PVA | — | — | — | — | — | — | — | — | — | — | — | — | — | — | — |
| | | PNVF | — | — | — | — | — | — | — | — | — | — | — | — | — | — | — |
| | Dispersion stability | | 3 | 3 | 3 | 3 | 3 | 3 | 3 | 3 | 3 | 3 | 3 | 3 | 3 | 3 | 3 |

| | | | Comparative Example | | | | | |
|---|---|---|---|---|---|---|---|---|
| | Ingredients | | 1 | 2 | 3 | 4 | 5 | 6 |
| (A) | EVOH | Ethylene ratio 25 mol % | 95 | — | — | — | 92 | 8 |
| | | Ethylene ratio 32 mol % | — | 75 | 15 | 17 | — | — |
| | | Ethylene ratio 44 mol % | — | — | — | — | — | — |
| (B) (B1-1) | Radically polymerizable | Acrylic acid | 5 | — | 85 | 3 | 4 | 46 |
| | | Methacrylic acid | — | — | — | — | — | — |
| (B1-2) | Radically polymerizable sulfonic | HAPS | — | — | — | — | — | — |
| | | AMPS | — | 25 | — | — | — | — |
| (B2-1) | Radically polymerizable monomer of | m = 1 R1, R2: H | — | — | — | — | — | — |
| | | m = 23 R1, R2: Me | — | — | — | — | — | — |
| | | m = 45 R1, R2: Me | — | — | — | — | — | — |

TABLE 1-continued

|  |  |  |  |  |  |  |  |  |
|---|---|---|---|---|---|---|---|---|
|  | Formula (a) | m = 113 R1, R2: Me | — | — | — | 80 | — | — |
|  | Radically | NVF | — | — | — | — | — | — |
|  | polymerizable | AAm | — | — | — | — | — | — |
| (B2-2) | Radically | DMAA | — | — | — | — | — | — |
|  | polymerizable | GMA | — | — | — | — | — | — |
| (C) | Hydrophilic | PEG | — | — | — | — | — | 46 |
|  | compound | PEO | — | — | — | — | 4 | — |
|  |  | PVP | — | — | — | — | — | — |
|  |  | EO-PVA | — | — | — | — | — | — |
|  |  | PNVF | — | — | — | — | — | — |
|  | Dispersion stability |  | 1* | 1* | 1** | 1* | 1* | 1* |

*= Aggregation
**= Separtion

In Table 1, the numerical values recited in a column of each of Examples and Comparative Examples represent the content (mass %) of each component in the solid content of an aqueous resin dispersion. Further, the abbreviations of materials shown in Table 1 represent the followings. HAPS: a sodium salt of 3-allyloxy-2-hydroxy-1-propanesulfonic acid AMPS: 2-acrylamido-2-methylpropanesulfonic acid NVF: N-vinylformamide AAm: acrylamide DMAA: N,N-dimethylacrylamide GNA: glycidyl methacrylate PEG: polyethylene glycol (weight average molecular weight: 20000)

PEO: polyethylene oxide (weight average molecular weight: 500000)

PVP: polyvinylpyrrolidone (weight average molecular weight: 20000)

EO-PVA: polyoxyethylene-modified polyvinyl alcohol (weight average molecular weight: 20000)

PNVF: poly-N-vinylformamide (weight average molecular weight: 100000)

Comparison of Examples 1 to 37 with Comparative Example 2 revealed that the aqueous resin dispersions from Examples 1 to 37 showed superior dispersion stability. These results demonstrate that according to the aqueous resin dispersion of the present invention including the radical polymer (B) having a structural unit derived from the radically polymerizable carboxylic acid monomer (B1-1), a dispersion with excellent dispersion stability can be obtained.

Further, comparison of Examples 1 to 37 with Comparative Examples 1 and 5 revealed that the aqueous resin dispersions from Examples 1 to 37 showed superior dispersion stability. These results demonstrate that according to the aqueous resin dispersion of the present invention in which the content of the radical polymer (B) relative to the total amount of the EVOH (A) and the radical polymer (B) was 10 mass % or more, a dispersion with excellent dispersion stability can be obtained.

Moreover, comparison of Examples 1 to 37 with Comparative Examples 3, 4, and 6 revealed that the aqueous resin dispersions from Examples 1 to 37 showed superior dispersion stability. These results demonstrate that according to the aqueous resin dispersion of the present invention in which the content of the radical polymer (B) relative to the total amount of the EVOH (A) and the radical polymer (B) was 80 mass % or less, a dispersion with excellent dispersion stability can be be obtained.

Example 38 to Example 56

<Preparation of Hydrophilization Agent>

The aqueous resin dispersion (D) manufactured in Examples 1, 6, 11, and 15, the hydrophilic compound (E), and the cross-linking agent (F) were mixed according to blended amounts (contents) shown in Table 2 to prepare the hydrophilization agents for Examples 38 to 56 and Comparative Examples 7 and 8.

<Preparation of Cross-Linkable Microparticles>

Cross-linkable microparticles belonging to the hydrophilic compound (E) recited in Examples of Table 2 were prepared as follows. A monomer solution in which 70 parts by mass of N-methylolacrylamide and 30 parts by mass of methoxypolyethylene glycol monomethacrylate (a polyethylene chain with a number of repeating units of 90) were dissolved in 200 parts by mass of methoxy propanol and a solution in which "ACVA" (an azo-based initiator from Otsuka Chemical Co., Ltd.) was dissolved in 50 parts by mass of methoxy propanol were each added dropwise to 150 parts by mass of methoxy propanol through separate inlets at 105° C. over 3 hours under a nitrogen atmosphere, and further heated with stirring for 1 hour to allow for polymerization. Cross-linkable microparticles in the resulting dispersion liquid had an average particle size of 250 nm.

<Production of Test Plates>

A piece of 1000 series aluminum material having a dimension of 150 mm×200 mm×0.13 mm was degreased with a 1% solution of Surfcleaner™ EC370 from Nippon Paint Surf Chemicals Co., Ltd. at 70° C. for 5 seconds. Subsequently, treatment with phosphoric acid chromate was performed at 40° C. for 5 seconds using a 10% solution of Alsurf™ 407/47 from Nippon Paint Surf Chemicals Co., Ltd. Subsequently, the hydropilization agents obtained from Examples 38 to 56 and Comparative Examples 7 and 8 were each prepared so as to have 5% solid content, and each applied to the above aluminum material with a bar coater #4, and heated at 220° C. for 20 seconds, and dried to produce a test plate.

<Evaluation of Initial Hydrophilicity>

The contact angle of a water droplet against each test plate was evaluated. A water contact angle was measured with an automatic contact angle meter (model number: DSA20E, KRUSS GmbH). A contact angle between a test plate and a water droplet was measured under a room temperature environment, 30 seconds after the droplet was dropped. Evaluation results are shown in Table 2. It is noted that when the contact angle is 30° or less, hydrophilicity is considered good.

(Evaluation Criteria)
4: water contact angle was 20° or less
3: more than 20° but 30° or less
2: more than 30° but 50° or less
1: more than 50°
<Evaluation of Sustained Hydrophilicity>
A test plate was immersed into pure water for 240 hours, and then removed and dried. Subsequently, the water contact angle with a water droplet on the dried test plate was measured. A water contact angle was measured with an automatic contact angle meter (model number: DSA20E, KRUSS GmbH). A contact angle between a test plate and a water droplet under a room temperature environment, 30 seconds after the droplet was dropped. Evaluation results are shown in Table 2. It is noted that when the contact angle is 30° or less, sustained hydrophilicity is considered good.
(Evaluation Criteria)
4: water contact angle was 20° or less
3: more than 20° but 30° or less
2: more than 30° but 50° or less
1: more than 50°
<Evaluation of WET Adhesiveness>
Pure water was sprayed on a test plate, and then a coating was rubbed under a load of 500 g. One reciprocating motion was counted as one stroke, and maximumly 10 strokes of rubbing were performed until an underlying material was exposed, and then evaluation was performed. Evaluation results are shown in Table 2. When the number of strokes until the underlying material of a test plate was exposed was 7 or more, adhesiveness is considered good.
(Evaluation Criteria)
4: a hydrophilic coating was not removed after 10 strokes of sliding.
3: a hydrophilic coating was removed after 7 strokes or more of sliding but less than 10 strokes.
2: a hydrophilic coating was removed after 3 strokes or more of sliding but less than 7 strokes.
1: a hydrophilic coating was removed after less than 3 strokes of sliding.
<Drainage>
A 10-μL water droplet was placed on a horizontally arranged test plate. Subsequently, the test plate was positioned vertically, and time until the water droplet moved downward by 8 cm was measured. Drainage was then evaluated according to the following criteria. Evaluation results are shown in Table 2. It is noted that drainage was considered good when the evaluation score was 3 or more.
(Evaluation Criteria)
4: 15 seconds or less
3: more than 15 seconds but 25 seconds or less
2: more than 25 seconds but 40 seconds or less
1: more than 40 seconds
<Evaluation of Anti-Contamination Effects>
A test plate was immersed into pure water for 24 hours, and then removed and dried. Subsequently, the dried test plate was immersed for 30 seconds into a solution in which 3 parts by mass of stearic acid, 3 parts by mass of 1-octadecanol, 3 parts by mass of palmitic acids, and 3 parts by mass of bis(2-ethylhexyl)phthalate was dissolved in 1188 parts by mass of trichloroethylene. Pure water was sprayed to the test plate removed after permeation and air dried, which was then air dried. Then a water contact angle with a water droplet on the test plate was measured. A water contact angle was measured with an automatic contact angle meter (model number: DSA20E, KRUSS GmbH). A contact angle with a water droplet was measured under a room temperature environment, 30 seconds after the water droplet was dropped, and evaluation was performed according to the following criteria. Evaluation results are shown in Table 2. It is noted that when the contact angle is 30° or less, anti-contamination effects is considered good.
(Evaluation Criteria)
4: water contact angle was 20° or less
3: more than 20° but 30° or less
2: more than 30° but 50° or less
1: more than 50°

TABLE 2

| | Ingredients | Example 38 | 39 | 40 | 41 | 42 | 43 | 44 | 45 | 46 | 47 | 48 |
|---|---|---|---|---|---|---|---|---|---|---|---|---|
| (D) Aqueous resin dispersion | Example 1 | 40 | — | — | — | — | — | — | — | — | — | — |
| | Example 6 | — | 100 | — | — | 100 | — | — | 70 | — | 70 | — |
| | Example 11 | — | — | 100 | — | — | 100 | — | — | 60 | — | 60 |
| | Example 14 | — | — | — | 100 | — | — | 100 | — | — | — | — |
| | Example 15 | — | — | — | — | — | — | — | — | — | — | — |
| (E) Hydrophilic compound | Cross-linkable microparticles | 40 | — | — | — | — | — | — | 30 | — | 20 | — |
| | EO-PVA | 20 | — | — | — | — | — | — | — | 40 | — | 30 |
| | PVA | — | — | — | — | — | — | — | — | — | 10 | — |
| | PAA | — | — | — | — | — | — | — | — | — | — | 10 |
| | CMC | — | — | — | — | — | — | — | — | — | — | — |
| | PVP | — | — | — | — | — | — | — | — | — | — | — |
| | PEG | — | — | — | — | — | — | — | — | — | — | — |
| | NMAM | — | — | — | — | — | — | — | — | — | — | — |
| | PNVF | — | — | — | — | — | — | — | — | — | — | — |
| | Acrylic acid copolymer | — | — | — | — | — | — | — | — | — | — | — |
| | Sulfonic acid copolymer | — | — | — | — | — | — | — | — | — | — | — |
| (F) Cross-linking agent | Melamine resin | — | — | — | — | 2 | 1 | 25 | 2 | 2 | 2 | 2 |
| | Silane coupling agent | — | — | — | — | — | 2.5 | — | — | — | — | — |
| Total (parts by mass) | | 100 | 100 | 100 | 100 | 102 | 104 | 125 | 102 | 102 | 102 | 102 |
| Initial hydrophilicity | | 3 | 3 | 3 | 3 | 3 | 3 | 3 | 4 | 4 | 4 | 4 |
| Sustained Hydrophilicity | | 3 | 3 | 3 | 3 | 3 | 3 | 3 | 4 | 4 | 4 | 4 |
| Wet adhesiveness | | 3 | 3 | 3 | 3 | 4 | 4 | 4 | 4 | 4 | 4 | 4 |
| Drainage | | 3 | 3 | 3 | 3 | 3 | 3 | 3 | 4 | 4 | 4 | 4 |
| Anti-contamination effects | | 3 | 3 | 3 | 3 | 3 | 3 | 3 | 4 | 4 | 4 | 4 |

TABLE 2-continued

| | | Example | | | | | | | | Comparative Example | |
|---|---|---|---|---|---|---|---|---|---|---|---|
| Ingredients | | 49 | 50 | 51 | 52 | 53 | 54 | 55 | 56 | 7 | 8 |
| (D) Aqueous resin dispersion | Example 1 | — | — | — | — | — | — | — | — | — | — |
| | Example 6 | — | 60 | — | — | 80 | — | — | — | 100 | — |
| | Example 11 | — | — | 50 | — | — | 60 | — | — | — | 20 |
| | Example 14 | 70 | — | — | 60 | — | — | 80 | — | — | — |
| | Example 15 | — | — | — | — | — | — | — | 70 | — | — |
| (E) Hydrophilic compound | Cross-linkable microparticles | 20 | — | 40 | — | 10 | — | 10 | 30 | — | — |
| | EO-PVA | — | 30 | — | 30 | — | 30 | — | — | — | 80 |
| | PVA | — | — | — | — | — | — | — | — | — | — |
| | PAA | — | — | — | — | — | — | — | — | — | — |
| | CMC | 10 | — | — | — | — | — | — | — | — | — |
| | PVP | — | 10 | — | — | — | — | — | — | — | — |
| | PEG | — | — | 10 | — | — | — | — | — | — | — |
| | NMAM | — | — | — | 10 | — | — | — | — | — | — |
| | PNVF | — | — | — | — | 10 | — | — | — | — | — |
| | Acrylic acid copolymer | — | — | — | — | — | 10 | — | — | — | — |
| | Sulfonic acid copolymer | — | — | — | — | — | — | 10 | — | — | — |
| (F) Cross-linking agent | Melamine resin | 2 | 2 | 2 | 2 | 2 | 2 | 1 | 2 | 50 | 2 |
| | Silane coupling agent | — | — | — | — | — | — | — | — | — | — |
| Total (parts by mass) | | 102 | 102 | 102 | 102 | 102 | 102 | 102 | 102 | 150 | 102 |
| Initial hydrophilicity | | 4 | 4 | 4 | 4 | 4 | 4 | 4 | 4 | 2 | 3 |
| Sustained Hydrophilicity | | 4 | 4 | 4 | 4 | 4 | 4 | 4 | 4 | 1 | 2 |
| Wet adhesiveness | | 4 | 4 | 4 | 4 | 4 | 4 | 4 | 4 | 3 | 3 |
| Drainage | | 4 | 4 | 4 | 4 | 4 | 4 | 4 | 4 | 1 | 1 |
| Anti-contamination effects | | 4 | 4 | 4 | 4 | 4 | 4 | 4 | 4 | 1 | 2 |

In Table 2, the numerical values recited in a column of each of Examples and Comparative Examples represent the content (mass %) of each component in the solid content of a hydrophilization agent. Further, the abbreviations and descriptions of materials shown in Table 2 represent the followings. Cross-linkable microparticles: cross-linkable microparticles prepared as described above
EO-PVA: ethylene oxide-modified PVA (weight average molecular weight: 20000)
PVA: polyvinyl alcohol (weight average molecular weight: 20000, the degree of saponification: 98.5)
PAA: polyacrylic acid (weight average molecular weight: 20000, acid value: 780 mg KOH/g)
CMC: carboxymethylcellulose (weight average molecular weight: 20000)
PVP: polyvinylpyrrolidone (weight average molecular weight: 20000)
PEG: polyethylene glycol (weight average molecular weight: 20000)
NMAM: N-me thylolacrylamide
PNVF: poly-N-vinylformamide (weight average molecular weight: 100000)
Acrylic acid copolymer: a sodium salt of acrylic acid/vinylformamide copolymer (weight average molecular weight:700000)
Sulfonic acid copolymer: a sodium salt of 2-acrylamido-2-methylpropane sulfonic acid/acrylic acid copolymer (weight average molecular weight: 10000)
Melamine resin: "Cymel (registered trademark) 370N" from Nihon Cytec Industries Inc. Silane coupling agent: "KBM-403" from Shin-Etsu Chemical Co., Ltd.

Comparison of Examples 38 to 56 with Comparative Example 7 revealed that the hydrophilic coatings formed with the hydrophilization agents from Examples 38 to 56 was superior in any of initial hydrophilicity, sustained hydrophilicity, wet adhesiveness, drainage, and anti-contamination effects. These results demonstrate that according to the hydrophilization agent of the present invention including the cross-linking agent (F) in an amount within the range of 30 mass % or less relative to the total amount of the aqueous resin dispersion (D), the hydrophilic compound (E), and the cross-linking agent (F), a hydrophilic coating excellent in any of initial hydrophilicity, sustained hydrophilicity, wet adhesiveness, drainage, and anti-contamination effects can be obtained.

Comparison of Examples 38 to 56 with Comparative Example 8 revealed that the hydrophilic coatings formed with the hydrophilization agents from Examples 38 to 56 was superior in initial hydrophilicity, sustained hydrophilicity, wet adhesiveness, drainage, and anti-contamination effects. These results demonstrate that according to the hydrophilization agent of the present invention including the hydrophilic compound (E) and the cross-linking agent (F) in an amount within the range of 70 mass % or less relative to the total amount of the aqueous resin dispersion (D), the hydrophilic compound (E), and the cross-linking agent (F), a hydrophilic coating excellent in any of initial hydrophilicity, sustained hydrophilicity, wet adhesiveness, drainage, and anti-contamination effects can be obtained.

According to the aqueous resin dispersion of the present invention, a dispersion with excellent dispersion stability can be obtained. Further, according to the hydrophilization agent including that aqueous resin dispersion, a hydrophilic coating can be obtained having excellent (initial) hydrophilicity, in particular, excellent sustained hydrophilicity after adhesion of contaminants, and also having excellent adhesiveness, drainage, and anti-contamination effects. Therefore, the aqueous resin dispersion according to the present invention, a hydrophilization agent including the aqueous resin dispersion, and a hydrophilic coating obtainable with the hydrophilization agent are preferably used for metal, in particular aluminum and alloys thereof.

Example 57 to Example 89

The aqueous resin dispersion (D) manufactured in Examples 22, 26, 31, 34, and 37, the hydrophilic compound (E), the cross-linking agent (F), and anticorrosive material (G) were mixed according to the blended amounts (contents) shown in Table 3 to prepare the hydrophilization agents of Examples 57 to 89 and Comparative Examples 9 to 11.

<Preparation of Cross-Linkable Microparticles>

The cross-linkable microparticles belonging to the hydrophilic compound (E) recited in Examples of Table 3 were prepared in a similar way as described above.

<Production of Test Heat Exchanger>

For a test heat exchanger, the 1000 series aluminum material described above was used to produce an aluminum heat exchanger for automobile air-conditioners (NB heat exchanger). Subsequently, the test heat exchanger was subjected to surface treatment under the following treatment conditions. In each of Examples 57 to 89 and Comparative Examples 9 to 11 shown in Table 3, the above test heat exchanger was used for the following evaluation.

(Treatment Conditions)

Condition I: A surface of the test heat exchanger was acid-washed with a 5% liquid of sulfuric acid, and then washed with water. Subsequently, this was dip-coated with a 10% liquid of Alsurf™ 900 from Nippon Paint Surf Chemicals Co., Ltd. at 60° C. for 60 seconds to form a chemical conversion coating on the surface of the test heat exchanger. Subsequently, the hydrophilization agents obtained from Examples 57, 62, 63, 70, 71, and 81 to 89 and Comparative Examples 9 to 11 were each prepared so as to have 5% solid content, and used to perform dip-coating of the surface of the test heat exchanger. The resulting heat exchanger was then allowed to stand for 30 minutes under a 160° C. environment to produce a test heat exchanger.

Condition II: A surface of the test heat exchanger was acid-washed with a 5% liquid of sulfuric acid, and then washed with water. Subsequently, the hydrophilization agents obtained from Examples 58, 65, and 72 were each prepared so as to have 5% solid content, and used to perform dip-coating of the above surface of the test heat exchanger. The resultant heat exchanger was then allowed to stand for 30 minutes under a 160° C. environment. Subsequently, a 5-times diluted Surfalcoat™ 1100 from Nippon Paint Surf Chemicals Co., Ltd. was applied to this test heat exchanger, and heated and dried at 160° C. for 30 minutes to produce a test heat exchanger.

Condition III: A surface of the test heat exchanger was acid-washed with a 5% liquid of sulfuric acid, and then washed with water. Subsequently, this was dip-coated with Surfalcoat™ 510 from Nippon Paint Surf Chemicals Co., Ltd., and the resultant heat exchanger was then allowed to stand for 30 minutes under a 160° C. environment. Subsequently, the hydrophilization agents obtained from Examples 59 and 67 were each prepared so as to have 5% solid content, and used to perform dip-coating of the above surface of the test heat exchanger. The resultant heat exchanger was then allowed to stand for 30 minutes under a temperature environment of 160° C. to produce a test heat exchanger.

Condition IV: A surface of the test heat exchanger was washed with hot water, and then washed with water. Subsequently, the hydrophilization agents obtained from Examples 60, 64, 68, 69, 73 to 80 were each prepared so as to have 5% solid content, and used to perform dip-coating of the above surface of the test heat exchanger. The resultant heat exchanger was then allowed to stand for 30 minutes under a temperature environment of 160° C. to form a chemical conversion coating on the surface of the test heat exchanger.

Condition V: A surface of the test heat exchanger was acid-washed with a 5% liquid of sulfuric acid, and then washed with water. Subsequently, this was dip-coated with a 10% liquid of Alsurf™ 900 from Nippon Paint Surf Chemicals Co., Ltd. at 60° C. for 60 seconds to form a chemical conversion coating on the surface of the test heat exchanger. Subsequently, this was dip-coated with Surfalcoat™ 510 from Nippon Paint Surf Chemicals Co., Ltd., and heated and dried at 160° C. for 30 minutes. Subsequently, the hydrophilization agents obtained from Examples 61 and 66 were each prepared so as to have 5% solid content, and used to perform dip-coating of the above surface of the test heat exchanger. The resultant heat exchanger was then allowed to stand for 30 minutes under a temperature environment of 160° C. to form a chemical conversion coating on the surface of the test heat exchanger.

<Evaluation of Initial Hydrophilicity>

The contact angle of a water droplet against a fin surface of a test heat exchanger was evaluated according to similar evaluation criteria as in the evaluation of the initial hydrophilicity in Example 38 as described above. Evaluation results are shown in Table 3.

<Evaluation of Sustained Hydrophilicity>

Sustained hydrophilicity of a test heat exchanger was evaluated according to similar evaluation criteria as in the evaluation of initial hydrophilicity in Example 38 as described above. Evaluation results are shown in Table 3.

<Corrosion Resistance>

Test heat exchangers were evaluated for corrosion resistant (white rust resistance) in accordance with JIS 2371. Specifically, a solution of 5% sodium chloride was sprayed at 35° C. on each of the test heat exchangers produced in Examples and Comparative Examples, and then the area of portion(s) where white rust was developed was visually evaluated after 480 hours had passed in accordance with the following evaluation criteria. Evaluation results are shown in Table 3.

(Evaluation Criteria)

4: no white rust was developed, or white rust was observed with an area of white rust of less than 10%.
3: the area of white rust was 10% or more but less than 20%.
2: the area of white rust was 20% or more but less than 50%.
1: the area of white rust was 50% or more.

<Moisture Resistance>

The test heat exchangers were subjected to moisture resistance tests under an atmosphere of a temperature of 50° C. and a humidity of 98% or more for 480 hours. The area of a blackened portion after the test was visually evaluated in accordance with the following criteria for evaluating corrosion resistance. Evaluation results are shown in Table 3. It is noted that blackening may eventually turn into white rust, and thus the area of portion(s) wherein white rust was developed was added to the area of blackened portion(s).

(Evaluation Criteria)

4: no color change, or color change was observed with an area of discolored portion(s) of less than 10%.
3: the area of discolored portion(s) was 10% or more but less than 20%.
2: the area of discolored portion(s) was 20% or more but less than 50%.
1: the area of discolored portion(s) was 50% or more.

<Odorlessness>

After contacting the test heat exchanger with a stream of tap water for 72 hours, odor was evaluated in accordance with the following evaluation criteria. Evaluation results are shown in Table 3. It is noted that when an odor evaluation score is 2 or more, odorlessness is considered good.

(Evaluation Criteria)

3: no odor was sensed.
2: an odor was slightly sensed.
1: an odor was obviously sensed.

TABLE 3

| | Ingredients | | Example 57 | 58 | 59 | 60 | 61 | 62 | 63 | 64 | 65 | 66 | 67 | 68 | 69 |
|---|---|---|---|---|---|---|---|---|---|---|---|---|---|---|---|
| (D) | Aqueous resin dispersion | Example 22 | — | — | — | — | 100 | — | — | — | — | — | 100 | 100 | 100 |
| | | Example 26 | — | — | — | — | — | 100 | — | — | — | — | — | — | — |
| | | Example 31 | — | — | — | — | — | — | 100 | — | — | — | — | — | — |
| | | Example 34 | 100 | 100 | 100 | 100 | — | — | — | 100 | — | — | — | — | — |
| | | Example 37 | — | — | — | — | — | — | — | — | 100 | 100 | — | — | — |
| (E) | Hydrophilic compound | Cross-linkable microparticles | — | — | — | — | — | — | — | — | — | — | — | — | — |
| | | EO-PVA | — | — | — | — | — | — | — | — | — | — | — | — | — |
| | | PVA | — | — | — | — | — | — | — | — | — | — | — | — | — |
| | | PAA | — | — | — | — | — | — | — | — | — | — | — | — | — |
| | | PVP | — | — | — | — | — | — | — | — | — | — | — | — | — |
| | | PEG | — | — | — | — | — | — | — | — | — | — | — | — | — |
| | | Acrylic acid copolymer | — | — | — | — | — | — | — | — | — | — | — | — | — |
| | | Sulfonic acid copolymer | — | — | — | — | — | — | — | — | — | — | — | — | — |
| (F) | Cross-linking agent | Melamine resin | 2 | 2 | 2 | 2 | 2 | 2 | 2 | 2 | 2 | 2 | 2 | 2 | 2 |
| | | Silane coupling agent | — | — | — | — | — | — | — | — | — | — | — | — | — |
| (G) | Anticorrosive material | Zirconium compound | — | — | — | — | — | — | — | — | — | — | 2 | 5 | 5 |
| | | Vanadium compound | 1 | 1 | 1 | 1 | 1 | 1 | 1 | 1 | 1 | — | — | 5 | 5 |
| | | Titanium compound | 1 | 1 | 1 | 1 | 1 | 1 | 1 | 1 | 1 | — | — | — | — |
| | | Niobium compound | — | — | — | — | — | — | — | — | — | — | — | — | — |
| | | Phosphorus compounds | — | — | — | — | — | — | — | — | — | — | — | — | 20 |
| | | Cerium compound | — | — | — | — | — | — | — | — | — | — | — | — | — |
| | | Chromium compound | — | — | — | — | — | — | — | — | — | — | — | — | — |
| | Total (parts by mass) | | 104 | 104 | 104 | 104 | 104 | 104 | 104 | 104 | 104 | 102 | 104 | 112 | 132 |
| | Conditions I | | ○ | — | — | — | ○ | ○ | — | — | — | — | — | — | — |
| | Conditions II | | — | ○ | — | — | — | — | — | — | ○ | — | — | — | — |
| | Conditions III | | — | — | ○ | — | — | — | — | — | — | — | ○ | — | — |
| | Conditions IV | | — | — | — | ○ | — | — | — | ○ | — | — | — | ○ | ○ |
| | Conditions V | | — | — | — | — | ○ | — | — | — | — | ○ | — | — | — |
| | Initial hydrophilicity | | 4 | 4 | 4 | 4 | 4 | 4 | 4 | 4 | 3 | 4 | 4 | 4 | 3 |
| | Sustained Hydrophilicity | | 4 | 4 | 4 | 4 | 4 | 4 | 4 | 4 | 3 | 4 | 4 | 4 | 3 |
| | Corrosion resistance | | 4 | 4 | 4 | 4 | 4 | 4 | 4 | 4 | 4 | 4 | 4 | 4 | 4 |
| | Moisture resistance | | 4 | 4 | 4 | 4 | 4 | 4 | 4 | 4 | 4 | 4 | 4 | 4 | 4 |
| | Odorlessness | | 3 | 3 | 3 | 3 | 3 | 3 | 3 | 3 | 3 | 3 | 3 | 3 | 2 |

| | Ingredients | | Example 70 | 71 | 72 | 73 | 74 | 75 | 76 | 77 | 78 | 79 | 80 | 81 | 82 |
|---|---|---|---|---|---|---|---|---|---|---|---|---|---|---|---|
| (D) | Aqueous resin dispersion | Example 22 | — | — | — | — | — | — | — | 100 | 100 | 100 | 100 | 78 | — |
| | | Example 26 | 100 | 100 | 100 | — | — | — | — | — | — | — | — | — | — |
| | | Example 31 | — | — | — | 100 | — | 100 | 100 | — | — | — | — | — | — |
| | | Example 34 | — | — | — | — | — | — | — | — | — | — | — | — | 78 |
| | | Example 37 | — | — | — | — | 100 | — | — | — | — | — | — | — | — |
| (E) | Hydrophilic compound | Cross-linkable microparticles | — | — | — | — | — | — | — | — | — | — | — | 10 | 20 |
| | | EO-PVA | — | — | — | — | — | — | — | — | — | — | — | — | — |
| | | PVA | — | — | — | — | — | — | — | — | — | — | — | — | — |
| | | PAA | — | — | — | — | — | — | — | — | — | — | — | — | — |
| | | PVP | — | — | — | — | — | — | — | — | — | — | — | — | — |
| | | PEG | — | — | — | — | — | — | — | — | — | — | — | — | — |
| | | Acrylic acid copolymer | — | — | — | — | — | — | — | — | — | — | — | — | — |
| | | Sulfonic acid copolymer | — | — | — | — | — | — | — | — | — | — | — | — | — |
| (F) | Cross-linking agent | Melamine resin | 2 | 2 | 2 | 2 | 2 | 2 | 2 | 2 | 2 | 2 | 10 | 1 | 2 |
| | | Silane coupling agent | — | — | — | — | — | — | — | — | — | — | — | 25 | — |
| (G) | Anticorrosive material | Zirconium compound | — | — | 1 | 1 | 1 | 3 | 5 | — | — | — | — | 0.1 | 1 |
| | | Vanadium compound | — | — | — | — | — | 3 | — | 3 | — | 5 | 1 | — | — |
| | | Titanium compound | — | — | 1 | 1 | 1 | 3 | — | 2 | 5 | — | 1 | — | 1 |
| | | Niobium compound | — | — | — | — | — | — | — | — | — | — | — | — | — |
| | | Phosphorus compounds | — | — | — | — | 14 | — | — | — | — | — | — | — | — |
| | | Cerium compound | — | — | — | — | — | — | — | — | — | — | — | — | — |
| | | Chromium compound | 3 | — | — | — | — | — | — | — | — | — | — | — | — |
| | Total (parts by mass) | | 105 | 102 | 104 | 104 | 104 | 122 | 107 | 107 | 107 | 107 | 112 | 92 | 102 |
| | Conditions I | | ○ | ○ | — | — | — | — | — | — | — | — | — | ○ | ○ |
| | Conditions II | | — | — | ○ | — | — | — | — | — | — | — | — | — | — |
| | Conditions III | | — | — | — | — | — | — | — | — | — | — | — | — | — |
| | Conditions IV | | — | — | — | ○ | ○ | ○ | ○ | ○ | ○ | ○ | ○ | — | — |
| | Conditions V | | — | — | — | — | — | — | — | — | — | — | — | — | — |
| | Initial hydrophilicity | | 4 | 4 | 4 | 4 | 4 | 3 | 4 | 4 | 4 | 4 | 3 | 4 | 4 |
| | Sustained Hydrophilicity | | 4 | 4 | 4 | 4 | 4 | 3 | 4 | 4 | 4 | 4 | 3 | 4 | 4 |
| | Corrosion resistance | | 4 | 4 | 4 | 4 | 4 | 4 | 4 | 4 | 4 | 4 | 4 | 4 | 4 |

TABLE 3-continued

| | | | | | | | | | | | | | |
|---|---|---|---|---|---|---|---|---|---|---|---|---|---|
| Moisture resistance | | 4 | 4 | 4 | 4 | 4 | 4 | 4 | 4 | 4 | 4 | 4 | 4 |
| Odorlessness | | 2 | 3 | 3 | 3 | 3 | 2 | 3 | 3 | 3 | 3 | 3 | 3 |

| | | | Example | | | | | | | Comparative Example | | |
|---|---|---|---|---|---|---|---|---|---|---|---|---|
| | Ingredients | | 83 | 84 | 85 | 86 | 87 | 88 | 89 | 9 | 10 | 11 |
| (D) Aqueous resin dispersion | Example 22 | | — | 88 | — | — | — | — | — | — | 20 | — |
| | Example 26 | | 88 | — | — | 88 | — | — | — | — | — | — |
| | Example 31 | | — | — | 88 | — | — | — | 88 | — | — | — |
| | Example 34 | | — | — | — | — | 88 | — | — | — | — | — |
| | Example 37 | | — | — | — | — | — | 88 | — | 100 | — | 100 |
| (E) Hydrophilic compound | Cross-linkable microparticles | | — | — | — | — | — | — | — | — | — | — |
| | EO-PVA | | 10 | — | — | — | — | — | — | — | — | — |
| | PVA | | — | 10 | — | — | — | — | — | — | 80 | — |
| | PAA | | — | — | 10 | — | — | — | — | — | — | — |
| | PVP | | — | — | — | 10 | — | — | — | — | — | — |
| | PEG | | — | — | — | — | 10 | — | — | — | — | — |
| | Acrylic acid copolymer | | — | — | — | — | — | 10 | — | — | — | — |
| | Sulfonic acid copolymer | | — | — | — | — | — | — | 10 | — | — | — |
| (F) Cross-linking agent | Melamine resin | | 2 | 2 | 2 | — | 2 | 2 | 2 | 50 | — | — |
| | Silane coupling agent | | — | — | — | — | — | — | — | — | — | — |
| (G) Anticorrosive material | Zirconium compound | | 1 | — | — | 1 | — | 5 | — | — | — | 40 |
| | Venadium compound | | 1 | 5 | 1 | 1 | — | 2 | — | — | — | — |
| | Titanium compound | | — | 1 | — | — | — | — | — | — | — | — |
| | Niobium compound | | — | — | — | — | 1 | — | — | — | — | — |
| | Phosphorus compounds | | — | — | — | — | — | — | — | — | — | — |
| | Cerium compound | | — | — | 1 | — | — | — | — | — | — | — |
| | Chromium compound | | — | — | — | — | — | — | 1 | — | — | — |
| Total (parts by mass) | | | 102 | 106 | 102 | 100 | 101 | 107 | 101 | 150 | 100 | 140 |
| Conditions I | | | ○ | ○ | ○ | ○ | ○ | ○ | ○ | ○ | ○ | ○ |
| Conditions II | | | — | — | — | — | — | — | — | — | — | — |
| Conditions III | | | — | — | — | — | — | — | — | — | — | — |
| Conditions IV | | | — | — | — | — | — | — | — | — | — | — |
| Conditions V | | | — | — | — | — | — | — | — | — | — | — |
| Initial hydrophilicity | | | 4 | 4 | 4 | 4 | 4 | 4 | 4 | 1 | 3 | 1 |
| Sustained Hydrophilicity | | | 4 | 4 | 4 | 4 | 4 | 4 | 4 | 1 | 2 | 1 |
| Corrosion resistance | | | 4 | 4 | 4 | 4 | 4 | 4 | 4 | 3 | 1 | 3 |
| Moisture resistance | | | 4 | 4 | 4 | 4 | 4 | 4 | 4 | 3 | 1 | 3 |
| Odorlessness | | | 3 | 3 | 3 | 3 | 3 | 3 | 3 | 1 | 2 | 1 |

In Table 3, the numerical values recited in a column of each of Examples and Comparative Examples represent the content (mass %) of each component in the solid content of a hydrophilization agent. Further, the abbreviations and descriptions of materials shown in Table 3 represent the followings. Cross-linkable microparticles: cross-linkable microparticles prepared as described above
EO-PVA: ethylene oxide-modified PVA (weight average molecular weight: 20000)
PVA: polyvinyl alcohol (weight average molecular weight: 20000, the degree of saponification: 98.5)
PAA: polyacrylic acid (weight average molecular weight: 20000, acid value: 780 mg KOH/g)
PVP: polyvinylpyrrolidone (weight average molecular weight: 20000)
PEG: polyethylene glycol (weight average molecular weight: 20000)
Acrylic acid copolymer: a sodium salt of acrylic acid/N-vinylformamide copolymer (weight average molecular weight:700000)
Sulfonic acid copolymer: a sodium salt of 2-acrylamido-2-methylpropane sulfonic acid/acrylic acid copolymer (weight average molecular weight: 10000)
Melamine resin: "Cymel (registered trademark) 370N" from Nihon Cytec industries Inc. Silane coupling agent: "KBM-403" from Shin-Etsu Chemical Co., Ltd. Zirconium compound: ammonium hexafluorozirconate
Vanadium compound: ammonium metavanadate
Titanium compound: titanium diisopropoxy bis(triethanolaminate)
Niobium compound: niobium hydroxide
Phosphorus compounds: polyphosphoric acid
Cerium compound: ceric ammonium nitrate
Chromium compound: chromium nitrate Comparison of Examples 57 to 89 with Comparative Examples 9 to 11 shown in Table 3 revealed that the hydrophilic coatings formed with the hydrophilization agents from Examples 57 to 89 were superior in any of initial hydrophilicity, sustained hydrophilicity, corrosion resistance, moisture resistance, and odorlessness. These results demonstrate that according to the hydrophilization agent of the present invention including the hydrophilic compound (E) and the cross-linking agent (F) in an amount within the range of 70 mass % or less relative to the total amount of the aqueous resin dispersion (D), the hydrophilic compound (E), and the cross-linking agent (F), and including the cross-linking agent (F) in an amount within the range of 30 mass % or less relative to the total amount of the aqueous resin dispersion (D), the hydrophilic compound (E), and the cross-linking agent (F), and including the anticorrosive material (G) in an amount within the range of 30 mass % or less relative to the total amount of the aqueous resin dispersion (D), the hydrophilic compound (E), and the cross-linking agent (F), a hydrophilic coating excellent in any of initial hydrophilicity, sustained hydrophilicity, corrosion resistance, moisture resistance, and odorlessness can be obtained.

According to the hydrophilization agent including an inorganic compound of the present embodiment, a hydrophilic coating having excellent (initial) hydrophilicity and sustained hydrophilicity, and also having excellent corrosion resistance, moisture resistance, and odorlessness can be formed regardless of a precoat to be applied to a base material (aluminum material) before assembling a heat exchanger or a post coat to be applied to a heat exchanger (base material) after assembly. Therefore, the aqueous resin dispersion according to the present invention, a hydrophilization agent including the aqueous resin dispersion, and a hydrophilic coating obtainable with the hydrophilization agent are preferably used for heat exchangers of automobiles, air-conditioners, and the like.

The invention claimed is:

1. A method of manufacturing an aqueous resin dispersion (D), wherein the aqueous resin dispersion (D) comprises: ethylene-vinylalcohol copolymer (A), and a radical polymer (B) having a structural unit derived from a radically polymerizable carboxylic acid monomer (Bl-1), wherein the content of an ethylene structural unit in the ethylene-vinylalcohol copolymer (A) is 24 to 44 mol%, and the content of the radical polymer (B) is 20 to 80 mass% relative to the total amount of the ethylene-vinylalcohol copolymer (A) and the radical polymer (B), wherein the method of manufacturing the aqueous resin dispersion comprises the step of:

performing a (co)polymerization reaction of the radically polymerizable carboxylic acid monomer (Bl-1) in a solution containing the ethylene-vinylalcohol copolymer (A) to obtain the radical polymer (B).

2. The method of manufacturing an aqueous resin dispersion (D), wherein the aqueous resin dispersion (D) comprises: ethylene-vinylalcohol copolymer (A), a radical polymer (B) having a structural unit derived from a radically polymerizable carboxylic acid monomer (Bl-1), and at least one hydrophilic compound (C) selected from the group consisting of a compound having a structure represented by the following formula (b), a compound having a structure of polyvinylpyrrolidone, and a compound having a structure of poly-N-vinylformamide, wherein the content of an ethylene structural unit in the ethylene-vinylalcohol copolymer (A) is 24 to 44 mol%, and wherein the content of the radical polymer (B) is 20 to 80 mass% relative to the total amount of the ethylene-vinylalcohol copolymer (A) and the radical polymer (B), wherein the total content of the radical polymer (B) and the hydrophilic compound (C) being 10 to 80 mass% relative to the total amount of the ethylene-vinylalcohol copolymer (A), the radical polymer (B), and the hydrophilic compound (C):

[Chem. 2]

$$R3O(CH_2CH_2O)_n\text{-}\ldots \text{ Formula (b)},$$

wherein in the formula (b), R3 represents H or CH3-, and n represents an integer of 2 to 100,000, wherein the method of manufacturing the aqueous resin dispersion (D) comprises the step of: performing a (co)polynerization reaction of the radically polymerizable carboxylic acid monomer (Bl-1) in a solution containing the ethylene-vinylalcohol copolymer (A) and the hydrophilic compound (C) to obtain the radical polymer (B).

* * * * *